Patented Aug. 23, 1927.

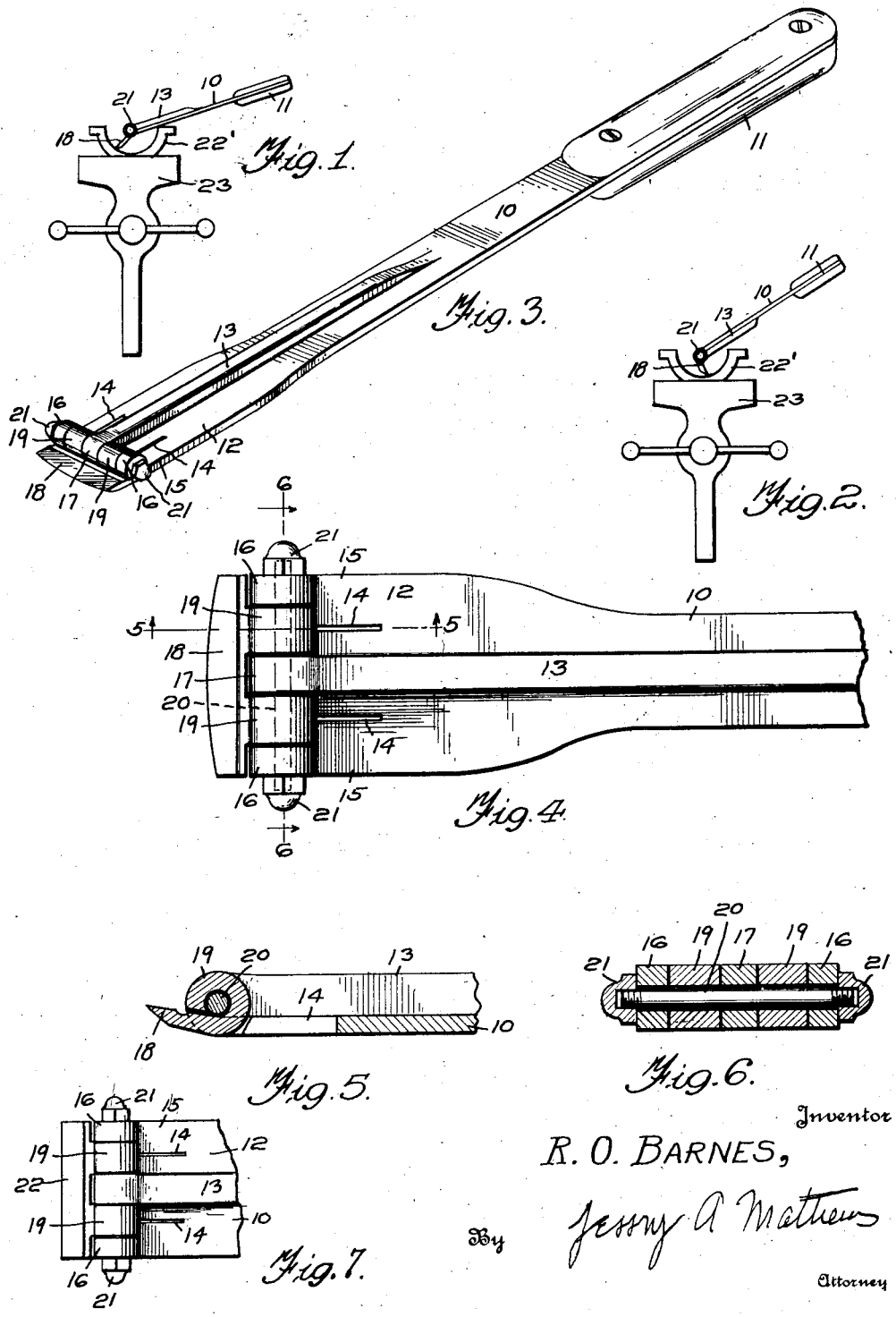

1,640,175

UNITED STATES PATENT OFFICE.

ROLLAND O. BARNES, OF WALKERTON, INDIANA.

TOOL FOR SCRAPING BEARINGS.

Application filed May 11, 1926. Serial No. 108,288.

My invention relates to a tool for scraping bearings.

In accordance with my invention, I provide a tool which may be employed for scraping old or new bearings. The blade of the tool is angularly adjustably mounted upon the handle of the same, so that it may be set at a selected angle, depending upon the diameter of the bearing to be scraped. The adjustability of the blade is such that the tool may be manipulated by a pushing or pulling action. I may employ a blade having a curved cutting edge, for the preliminary scraping operation, and then a blade having a straight edge for truing the scraped surface. By the use of this tool, the bearing may be treated so that it will have no low spots, and will, therefore, possess the maximum bearing surface.

In the accompanying drawings forming a part of this specification and in which like numerals are employed to designate like parts throughout the same, Figure 1 is a side elevation of a scraping tool embodying my invention, showing the blade adjusted for a pushing action, Figure 2 is a similar view, showing the blade adjusted for a pulling action.

Figure 3 is a perspective view of the tool,

Figure 4 is a plan view of the same, parts broken away,

Figure 5 is a longitudinal section taken on line 5—5 of Figure 4,

Figure 6 is a transverse section taken on line 6—6 of Figure 4, and,

Figure 7 is a plan view of the truing blade,

In the accompanying drawings, wherein for the purpose of illustration, is shown a preferred embodiment of my invention, the tool is shown as embodying a shank 10, preferably formed of flat strap-iron, and provided at its rear end with a handle 11, as shown. At its forward end, the shank 10, diverges, into the form of a flat widened head 12, which is provided upon its upper surface with a reinforcing rib 13, formed integral therewith. This rib extends rearwardly along the shank 10, for a substantial distance, as shown. The rear end of the rib is preferably tapered.

The head 12 is provided at its forward end with longitudinal slots 14, arranged upon opposite sides of the rib 13, and extending through the forward end of the head. These slots produce wings 15, which are capable of being slightly laterally shifted, by means to be described. The wings 15 are provided at their forward ends with knuckles 16, projecting beyond the forward end of the head 12 and the rib 13 is provided at its forward end with a knuckle 17, as shown.

The numeral 18 designates a scraping blade, preferably having a curved cutting edge, and this blade is provided with rearwardly extending knuckles 19, arranged between the knuckles 16 and 17. Extending through the assembled knuckles 16, 17 and 19, is a bolt 20, the opposite ends of which are threaded for the reception of nuts 21. It is obvious that by manipulation of the nut or nuts 21, the blade 18 may be set at a selected angular position, with respect to the shank 10, and then locked to the head 12 in its position. The slots 14 permit of the slight yielding action of the wings 15, due to the clamping action of the nut or nuts 21 whereby the knuckles 16, 17 and 19 may be positively locked together.

In Figure 7, the numeral 22 designates a scraping blade, which is identical with the blade 18, except that it has a straight cutting edge. This blade is employed in truing the surface of the bearing after or before being scraped with the blade 18.

As clearly shown in Figure 1, the bearing 22, to be scraped, is held in a vise 23. The scraping blade, such as the blade 18, may be set at an angle, to extend downwardly in a forwardly direction, with respect to the shank of the handle. The angular position of the blade will depend upon the diameter of the bearing. The operator holds the handle 11 in the right hand and works the scraper forwardly, exerting sufficient downward pressure on the shank, by the left hand, which may be placed upon the top of the shank 10, against the rear end of the rib 13. As shown in Figure 2, the scraping blade may be angularly adjusted to extend downwardly and rearwardly with relation to the handle, and when so adjusted the scraping is accomplished by a rearward pulling action, as is obvious. It will be seen that the blade has a wide range of adjustability and may be adjusted throughout the major portion of the entire circle. The blade 18 with the curved edge, may be advantageously employed for scraping old bearings, and when it is desired to true the scraped surface, the straight edged blade 22 is employed, which is locked upon the head 12 in the desired angular position.

It is to be understood that the form of my invention, herewith shown and described is to be taken as a preferred example of the same, and that various changes in the shape, size and arrangement of parts may be resorted to without departing from the spirit of my invention, or the scope of the subjoined claims.

Having thus described my invention, I claim:—

1. An implement for scraping or truing bearings, comprising a shank provided at its forward end with spaced knuckles and longitudinal slots which extend rearwardly from the knuckles, a scraping blade provided at its rear end with spaced knuckles to interfit with the first named knuckles, and a clamping bolt passing through the knuckles and adapted to lock the two sets of knuckles together so that the scraping blade may be positively held at a selected angle with respect to the shank.

2. An implement for scraping or truing bearings, comprising a shank provided at its forward end with a widened head, said head having a pair of outer knuckles and an inner knuckle and being further provided with longitudinal slots between the outer and inner knuckles, said slots extending rearwardly from said knuckles, a scraping blade having knuckles fitting between the outer and inner knuckles of the head, and a clamping bolt passing through the knuckles and adapted to lock the two sets of knuckles together whereby the scraping blade may be positively held at a selected angle with relation to the shank.

3. An implement for scraping or truing bearings, comprising a shank provided with a widened head, said head having a longitudinal reinforcing rib projecting forwardly beyond the same in the form of a knuckle, the said head having outer knuckles spaced from the inner knuckle and longitudinal slots between the outer and inner knuckles, said slots extending rearwardly from said knuckles, a scraping blade provided with knuckles interfitting with the first named knuckles, and a clamping bolt passing through all of said knuckles and adapted to lock the two sets of knuckles together whereby the blade may be positively held at a selected angle with relation to the shank.

In testimony whereof I affix my signature.

ROLLAND O. BARNES.